April 8, 1969 F. R. DICKEY, JR 3,438,030
OBJECT DETECTION SYSTEM
Filed Jan. 27, 1955

Inventor:
Frank R. Dickey, Jr.
by Michael Masnik
His Attorney

United States Patent Office 3,438,030
Patented Apr. 8, 1969

3,438,030
OBJECT DETECTION SYSTEM
Frank R. Dickey, Jr., De Witt, N.Y., assignor to General Electric Company, a corporation of New York
Filed Jan. 27, 1955, Ser. No. 484,547
Int. Cl. G01s 9/42, 9/02, 3/00
U.S. Cl. 343—7.7     34 Claims This invention relates primarily to signal detection systems and methods and particularly to radar arrangements for discriminating against fixed objects in favor of moving objects.

Moving target indicating or MTI systems of the radar type are capable of distinguishing moving objects from fixed objects. Generally these systems make use of the fact that the combined echoes, returned from fixed objects at the same range, appear with constant amplitude at the radar receiver, whereas echoes returned from moving objects at the same range have an amplitude which varies. By a system of cancellation of successive composite echoes received from objects at the same range, it is possible to eliminate the constant phase echo returns from the fixed objects and obtain only returns from the moving or variable phase objects. This scheme works well for the situation where the radar system is relatively fixed in space. However, in the case of high speed airborne radar systems, the motion of the radar antenna in space during flight introduces a phase change in the transmitted and received signals even for fixed objects being detected. The present invention discloses an arrangement for compensating for the motion of the aircraft in an airborne moving target indicator system to permit improved cancellation of fixed targets, thereby more perfectly achieving a true moving target indication.

It is therefore an object of my invention to provide an improved arrangement and method for selecting moving objects among a general background of fixed objects.

Another object of my invention is to provide an improved method and means for detecting, controlling or processing signals.

Another object of my invention is to provide an airborne radar object detection system capable of discriminating against fixed targets in favor of moving targets independently of aircraft motion.

Another object of my invention is to compensate for aircraft motion in an airborne radar system by effectively displacing the phase center of the directive antenna employed in the system.

Another object of my invention is to provide an arrangement for altering the phase and amplitude of transmitted or received electrical waves to simulate the transmission or reception of said waves from points in space different from the actual physical location of the related antenna system.

Another object of my invention is to provide an arrangement for simulating the transmission or reception of electrical waves from points in space different from that from which they are actually transmitted or received.

Another object of my invention is to alter the electrical phase center of an antenna system.

A further object of my invention is to alter the electrical phase center of an antenna system in accordance with antenna motion.

In considering the motion of the aircraft with respect to the ground and fixed objects, it can be shown that the individual echoes returned from irradiated fixed objects, are subjected to a continuous phase change relative to one another depending upon the distance traveled by the aircraft during successive pulse transmissions, and on the azimuth and elevation angles of the irradiated ground area or fixed objects relative to the position of the aircraft. In order to compensate for the change in phase introduced by the motion of the aircraft relative to fixed objects, an arrangement is provided in accordance with the invention for making one transmission-reception cycle of the radar antenna system occupy the same position in space as another transmission-reception cycle did a moment before. That is, it is proposed to make one radiation pattern, corresponding to a transmission-reception cycle, occupy effectively the same position in space as did another pattern a moment before. To accomplish this it is necessary to vary the effective phase center of the antenna radiation pattern in accordance with the velocity of the aircraft and the angle between the direction of travel of the aircraft and the instantaneous directivity of the antenna. The phase center of an antenna beam pattern is the point about which rotation of the pattern will produce the minimum change of phase in the far field pattern. In effect, the phase center is the point in space from which the beam pattern appears to emanate. By obtaining this effective shift in the phase center of successive radiations, the motion of the aircraft is effectively cancelled out as far as the relative phases of various fixed object signals are concerned such that subsequent cancellation results only in moving target returns as in the case of a ground based radar system.

The features of the present invention which are believed to be novel are particularly pointed out in the appended claims.

In the following descriptions of radar systems embodying the invention, various types of analogue computers are employed to generate or modify signals of assigned wave shape, in order to facilitate an understanding of the invention. It is to be understood, however, that such assignments are employed purely by way of example and are not to be construed in any way as limiting the scope of the invention.

Figures 1, 2, 3:
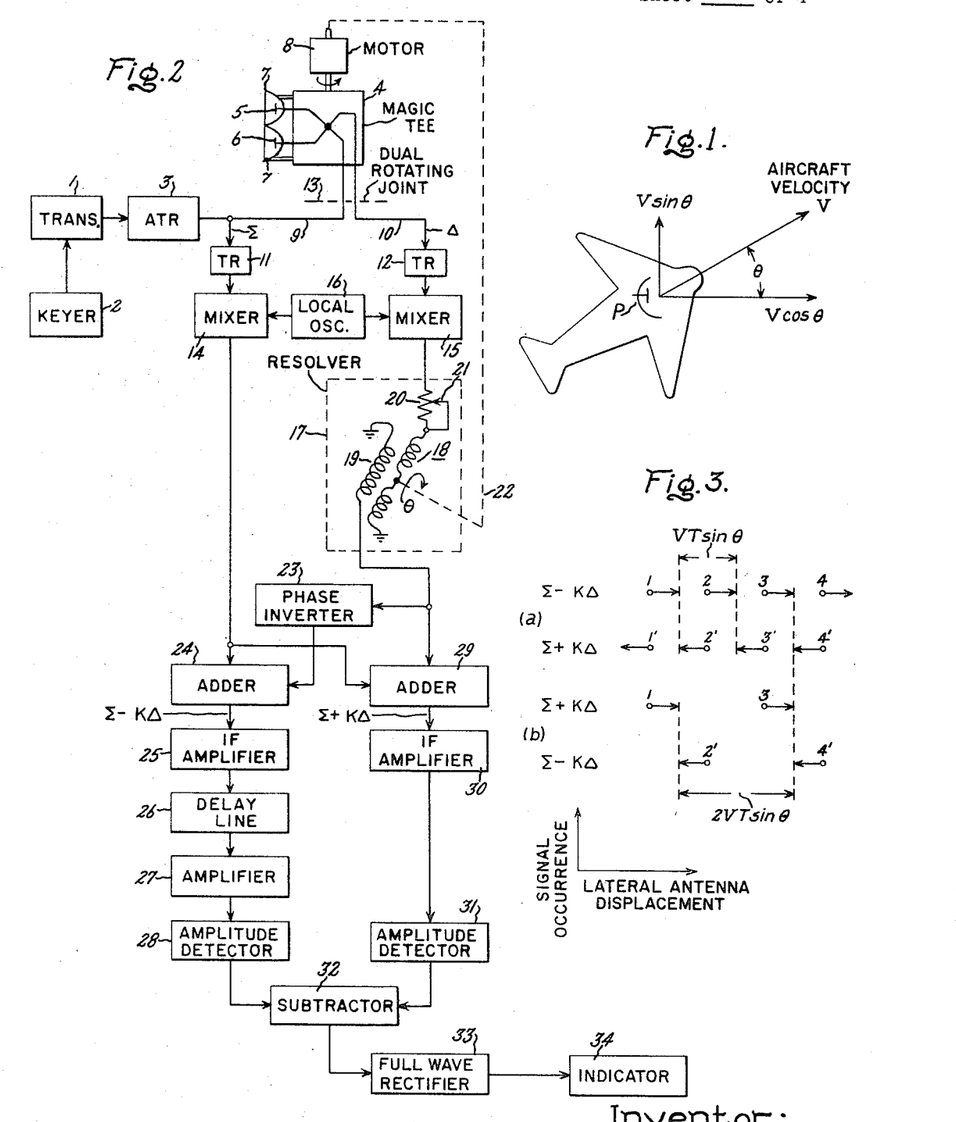
FIG. 1 is a diagrammatic representation useful in explaining the physical principles involved in the invention.
FIG. 2 is a combined block-diagram and schematic representation of an arrangement for compensating for the horizontal motion of a radar object detection system.
FIG. 3 is a graphical analysis of the operation of a portion of the invention.

In considering the motion of an aircraft with respect to the ground, or fixed objects it is convenient to consider components of the motion in the direction in which the antenna is pointing and components normal to this direction. Referring to FIG. 1 these components are the $V \cos \theta$ and $V \sin \theta$ where V is aircraft's ground speed and $\theta$ is the antenna angle with respect to the ground track.

These two components of the motion produce different effects. The component $V \cos \theta$ has a large effect on the phase of the signals from various objects, but with a narrow beam antenna this effect is the same for all the various signals which may be picked up under given conditions. This is the effect which is removed by using a non-coherent MTI system. On the other hand, the component $V \sin \theta$ has a smaller effect on the phase, but this effect is different for the various targets in the beam.

It depends on the angle of the arrival of each signal. This is the effect which is compensated for in the arrangement of FIG. 2.

Briefly, the system represented by FIG. 2 consists of a two feed antenna system having a pair of effectively parallel, spaced apart directivity patterns and which is commonly referred to as a monopulse or simultaneous lobing antenna system of the phase comparison type. On transmit, both feeds are excited in phase resulting in a resultant single transmitting lobe. On receipt, the signals received in the two feeds are added and subtracted to obtain the sum and difference signals. In an antenna of this type, if the difference signal is added to the sum signal, the apparent phase center of the antenna is shifted from the position it occupies when no difference signal is added. The amount of shift can be varied by adjusting the relative amplitude of the sum and difference signals.

The detailed operation of FIG. 2 is as follows: The radar transmitter 1 is keyed recurrently at a rate established by keyer 2 to supply pulses of high intensity radio frequency waves over the anti-TR box 3, the magic tee junction 4, to be described shortly, feed antenna system comprising antenna radiators 5 and 6. Radiators 5 and 6 operate in a well known manner in conjunction with their respective reflectors 7 to transmit the supplied pulses simultaneously in a pair of directive overlapping beams toward remotely located objects. The resultant radar beam is swept angularly in a 360° arc by the motor 8 which drives the antennas 5, 6 and reflectors 7 about a vertical axis. During any instantaneous angular position of the resultant radar beam, if echoes are returned from remote objects irradiated by the beam, these echoes are received by antennas 5 and 6 and applied through the arms 9 and 10 of the magic tee junction to the TR boxes 11 and 12. The magic tee junction is a commonly employed hybrid junction, of the waveguide or coaxial type, for deriving the sum and the difference of two applied signals at respective output channels. For further details of the operation of magic T's reference can be made to Patents 2,445,896 and 2,445,895 issued to Warren T. Tyrell on July 27, 1948.

Thus in the arrangement shown in FIG. 2 the received signals appearing on transmission line 9 comprises the sum or $\Sigma$ of the echoes received by antennas 5 and 6 whereas the received signals appearing on line 10 comprise the difference or $\Delta$ of the echoes received by antennas 5 and 6. It should be noted that in passing through the magic T junction, the difference signal, $\Delta$, undergoes no relative shift in phase with respect to the sum signal. Since antennas 5 and 6 are required to rotate about a vertical axis in synchronism with motor 8 in order to scan an area for objects, a dual rotating joint of well known form and shown symbolically by the dotted line 13 is employed to pass the received echoes from the moving portion of the transmission lines 9 and 10 associated with the antenna system to the corresponding stationary portions thereof associated with the radar receiver. The ATR and TR boxes 3, 11 and 12 are well known devices employed in the radar art to permit efficient transfer of high intensity radio waves from the transmitter 1 to the antennas 5 and 6 while blocking passage to the highly sensitive echo receiver connected to the output of the TR boxes 11 and 12 during the transmit portion of the radar transmit-receive cycle. During the receive portion of this cycle, these same devices operate to permit efficient transfer of the much weaker echo signals to the receiver. Thus upon reflection of an echo from a detected object, the sum and difference of the echoes received by antennas 5 and 6 are applied to respective mixer circuits 14 and 15 where they are mixed with local oscillations from oscillator 16 to yield difference and sum signals at an intermediate frequency level.

As previously mentioned if the difference signal $\Delta$ is added to the sum signal $\Sigma$, the apparent phase center of the antenna is shifted from the position it occupies when no difference signal is added. The amount of shift can be varied by adjusting the relative amplitude of the sum and difference signals. In the arrangement of FIG. 2 the latter is accomplished by applying the difference signal $\Delta$ through a resolver circuit 17. Resolver circuit 17 comprises a rotor winding portion 18, a stator winding portion 19 associated therewith, and potentiometer 20. The $\Delta$ signal from mixer 15 is first adjusted in amplitude by varying the moveable tap 21 in accordance with the product of the velocity V of the aircraft and the radar pulse repetition period T established by keyer 2. This adjusted signal is then applied to the rotor winding 18 which is mechanically coupled by linkage 22 to the shaft of motor 8 and arranged to rotate with respect to the stator winding 19 in synchronism with the antennas 5 and 6. The adjusted signal when applied to the rotor winding 18 induces a resultant signal in the stator winding 19 which is proportional to the product of $VT \sin \theta$. As will be explained shortly, modification of the relative amplitudes of the sum and difference signals in accordance with the product $VT \sin \theta$, and the subsequent combination of the sum and difference signals, compensates for the motion of the aircraft by making one round-trip, transmission reception antenna pattern look along the same line of sight in space as did the other pattern a moment before.

To simplify the description of the echo signals being processed, a symbol K is employed which is equal to the product $VT \sin \theta$. Thus the output of stator winding 19 is a signal $K\Delta$ which is subtracted from the sum signal $\Sigma$ available from the other mixer channel 14, by application through a phase inverter 23 before combination in the adder circuit 24. The output of adder circuit 24 yields a composite signal $\Sigma - K\Delta$ which is applied through an intermediate frequency amplifier stage 25 to an electrical signal delay line 26. The delay line 26 introduces a delay equal to that between successively transmitted radar pulses, as established by keyer 2, such that the phase of successively received echoes may be compared to derive the moving target information. The output of delay line 26 is amplified to a suitable level in amplifier 27 before being amplitude detected by detector 28. In order to derive another composite echo signal for comparison with that available from the detector 27, the $K\Delta$ signal available from stator winding 19 is added to the sum signal available from mixer 14 in the adder circuit 29. This resultant signal $\Sigma + K\Delta$ is amplified to a suitable level in amplifier 30 without the introduction of any time delay and then amplitude detected by a detector circuit 31. In order to derive the MTI information, the respective outputs of detectors 28 and 31 are subtracted in subtractor circuit 32 before being rectified in 33 and applied to the indicator 34 for display purposes.

Referring to FIG. 3, the principle involved in deriving the MTI information is described graphically. Graph 3a is a plot of echo signal time occurrence shown as the ordinate and the instantaneous antenna position as the abscissa. It is seen that derivation of the $\Sigma - K\Delta$ signal for a first echo has resulted in effecting movement of the radar antenna system phase center from its actual position in space, as exemplified by the origin of position vector, to a position shown by the terminus of vector 1. Furthermore the derivation of the $\Sigma + K\Delta$ signal for this same first echo has produced an effective shift in the phase center from the origin of position vector 1' to that of a proceeding position as shown by the terminus of vector 1'. Subsequently there is received a second echo, corresponding to a second radar pulse transmission under control of keyer 2, at a succeeding point in space designated by the origin of position vector 2. The derivation of the $\Sigma - K\Delta$ signal has effectively moved the phase center of the antenna system to a forward position in space designated by the terminus of vector 2, while moving the composite signal corresponding to $\Sigma + K\Delta$ backward in space to a position corresponding to that shown by the terminus of vector 2'. Comparison of vectors 1 and 2' reveals that their equivalent space positions coincide. In order that the two echo signals may be combined in time coincidence to derive proper MTI indications, it becomes necessary that the first echo be delayed for a full pulse repetition period, or the time between successively transmitted pulses. This accounts for the use of the delay line 26 shown in FIG. 2. Returning to FIG. 3a, it should be noted that the particular scheme of FIG. 1 permits MTI cancellation during every transmission reception cycle of the radar.

Figure 4:
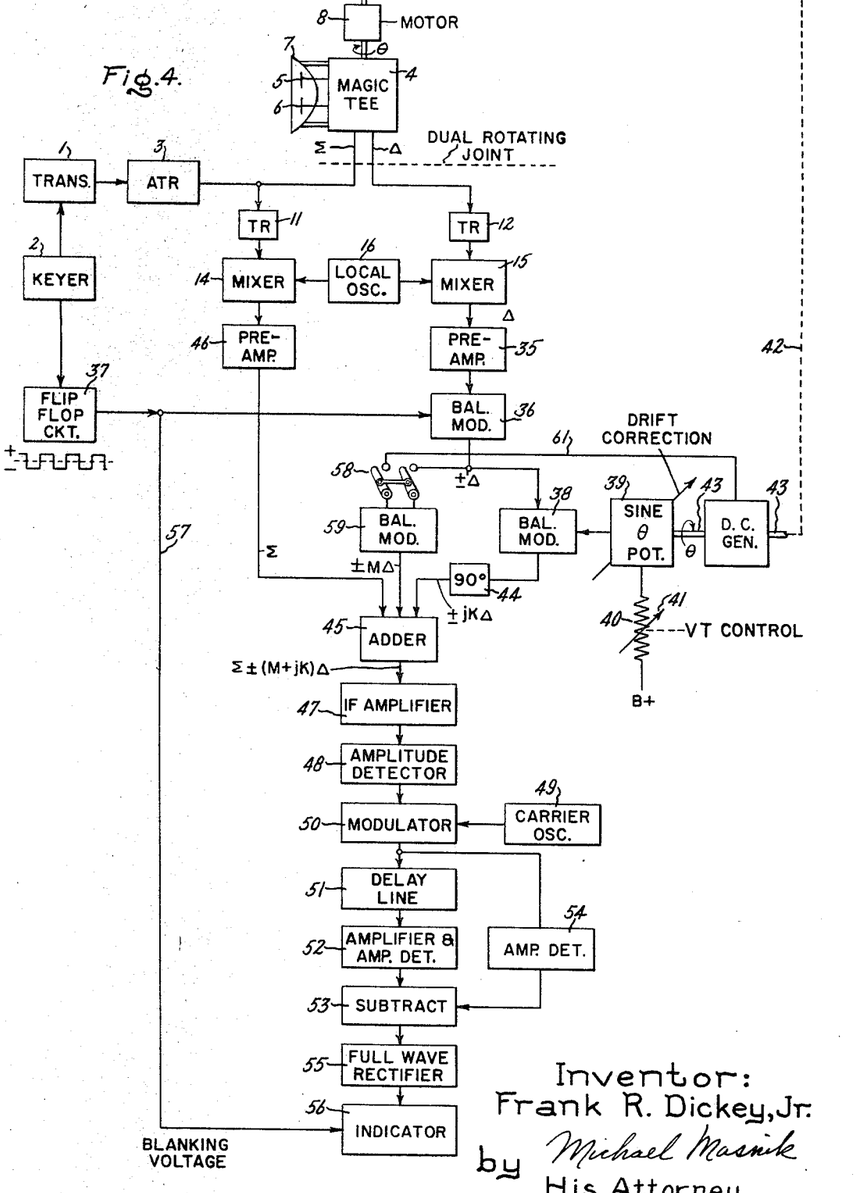
FIG. 4 is a combined block-diagram and schematic representation of an arrangement compensating for both horizontal translational and angular motion of a radar system.

The arrangement of FIG. 2 illustrated an MTI arrangement in which successive echo pulses are cancelled with the immediately preceding ones and in a manner designed to compensate for any horizontal translational motion of the antenna or object detection device. The arrangement of FIG. 4 illustrates a similar arrangement permitting a reduction in clutter due to translational motion on every other pulse with only these alternate pulses being displayed. It is known that an antenna undergoing high rotational speed introduces residual clutter in an MTI arrangement as well as one that undergoes translational motion. Accordingly, FIG. 4 has been constructed to illustrate an amplitude comparison form of antenna arrangement for compensating for residual clutter due to both horizontal linear and rotational motion of the antenna or object detection device. To simplify the description, wherever identical elements are found, the symbols used in FIG. 1 are retained in FIG. 4.

Briefly the arrangement involving components between the keyer 2 and the antennas 5 and 6, and between the antennas 5 and 6 and the mixer circuits 14 and 15 operate in a manner somewhat similar to that disclosed in connection with FIG. 1. The motion compensations circuitry on the other hand operates as follows: The difference signal $\Delta$, available from the mixer circuit 15 is applied through a preamplifier 35 to a balanced modulator 36 which reverses the phase of the $\Delta$ signal on alternate radar pulses under control of the flip flop circuit 37. The flip flop circuit is keyed by the keyer circuit 2 to develop a positive and negative going square wave at half the radar repetition frequency. Thus, in one arrangement the positive going portion of the flip flop output causes balanced modulator circuit 36 to develop a positive phase version of the difference signal, whereas the negative going output of the flip-flop circuit generates a negative phase version of the difference signal output. The positive and negative phase versions of the difference signals available from the output of the modulator 36 are applied to another balanced modulator circuit 38 where they are amplitude modulated in accordance with the signal $VT \sin \theta$ developed by the sine potentiometer 39 and the linear potentiometer 40. The resistance of potentiometer 40 is controlled as shown by the arrow 41 in accordance with the product of the velocity at which the radar antenna system is moving through space and the radar pulse repetition period T, whereas the output of the sine potentiometer 39 is controlled in accordance with the rotation of motor 8 by means of the mechanical connection 42 and shaft 43. As a further refinement the sine potentiometer setting established by the mechanical connection 42 may be shifted to compensate for any drift correction. The position and negative versions of the difference signal, after being amplitude modulated in 38 in accordance with the signal $VT \sin \theta$, are applied through a 90° phase shift circuit 44 to adder circuit 45 to be added to the sum signal available from the preamplifier circuit 46. It should be noted that in connection with the phase comparison antenna system of FIG. 2, no relative shift in phase of the sum and difference signals was required, whereas, in the case involving an amplitude comparison antenna system, the sum and difference channels must be adjusted to provide a relative phase shift of these signals of 90°. In FIG. 4, the difference signal is shifted 90° in phase by circuit 44 before being added to the sum signal. The ninety degree relative shift between the sum and difference signals is required in order to enable any relative change in amplitude of these two signals, as by use of the modulator circuit 38, to alter the effective phase centers of the radar antenna system.

If for the moment we disregard the remaining circuitry appearing before the adder circuit 45, and the use of the symbol M in the subsequent signal designations, the output of the adder circuit comprises a composite intermediate frequency signal equal to $\Sigma \pm jK\Delta$ with the polarity of the last term dependent upon the phase relationship established by modulator 36 under control of circuit 37. The result of deriving this composite signal is to move the effective phase center of the radar antenna system, during its receiving period, forward for one radar pulse transmission-reception cycle and backward on the next as shown in FIG. 3b. The cancellation of successive pulses is alternately improved and worsened by this process. In a manner to be described shortly, the control wave which reverses the difference signal phase in modulator 36 also is used to blank the indicator displaying the received echoes during unfavorable cycles.

The output of the adder circuit, $\Sigma \pm jK\Delta$ is amplified to a suitable level in circuit 47 before being amplitude detected by the circuit 48. The composite video signal available from the output of detector 48 is then superimposed upon a suitable carrier frequency available from carrier oscillator 49 in the modulator circuit 50 to permit efficient passage through the delay line 51. The delay line 51 serves the same purpose previously described in connection with FIG. 1, and introduces a delay equal to the time interval between successively transmitted radar pulses. The delayed composite signal at the carrier oscillator frequency is then amplified and detected in circuit 52 before being subtracted in circuit 53 with the signal from modulator 50 which is applied directly through the amplitude detector 54 to circuit 53. The cancelled, composite video signals from 53 are then rectified in circuit 55 before being applied to an indicator 56 for display purposes. To remove the previously mentioned unfavorable cycles of the MTI signal appearing at the output of rectifier 55, a portion of flip flop circuit 37 is also applied over lead 57 to the indicator for blanking purposes such that only the MTI signals which have been properly compensated are displayed. In a particular embodiment the indicator may be of the cathode ray tube type with a cathode ray beam intensity control electrode which is energized by the blanking signal from circuit 37.

In order to reduce the residual clutter due to rapid scan of the antennas 5 and 6, the switch 58 is closed permitting an amplitude modulated portion of the $\Delta$ signal available from the balanced modulator 36 to be added to the $\Sigma$ signals in the adder circuit 45. A balanced modulator circuit 59 is arranged to modulate the $\pm \Delta$ signal available from 36 in accordance with the instantaneous angular velocity of the antennas 5 and 6. The modulating signals for circuit 58 are derived from a direct current generator which is mechanically coupled to the antenna drive motor 8 by coupling 42 and shaft 43. This generator supplies a modulating signal M over lead 61 which is proportional to the angular velocity of antennas 5 and 6. The modulated difference signal $\pm M\Delta$, available from modulator 59, is added to the sum signal, $\Sigma$, without shifting the phase as in the case of compensation for translatory motion. The resulting composite signal $\Sigma \pm M\Delta$ available in the adder circuit 45 has an equivalent antenna pattern which is squinted with respect to the sum signal pattern. The rapid-scan compensation therefore rotates the beam, first slightly forward and then slightly backward. Thus in a manner similar to that described in connection with the linear compensation it is possible to reduce the scanning clutter for every other radar pulse transmission period and permit only these periods to be displayed on the indicator.

The arrangements shown in FIGS. 2 and 4 provide compensation for motion effects without taking into account the influence of the altitude of the aircraft. Although altitude has an effect, it is relatively small except at high altitudes and short ranges and hence can usually be neglected. However, if it becomes necessary to take into account the effect of altitude this can be done by a further modification shown in FIGURE 5. This circuit is more complex than either of the others but gives more accurate compensation, particularly at high altitudes.

Figure 6:
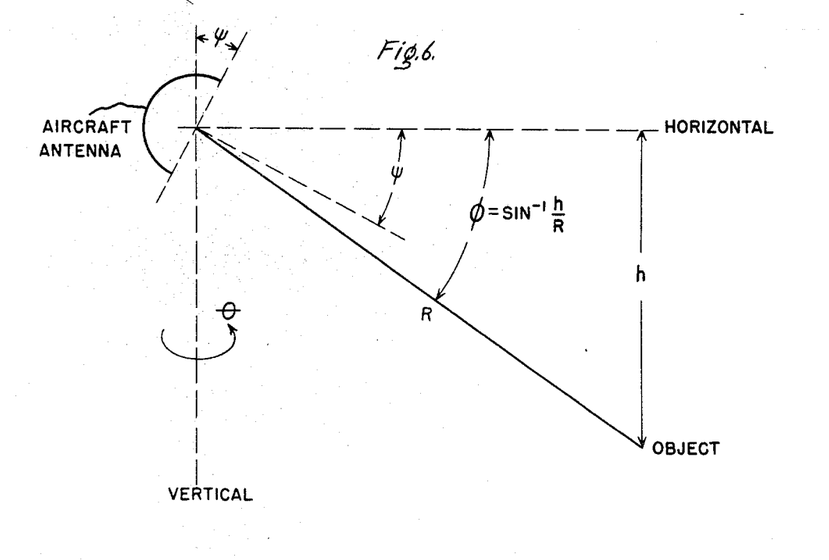
FIG. 6 is a graphical presentation of the physical quantities involved in the arrangement of FIG. 5.

It may be shown that the motion effects are due (1), to a horizontal antenna displacement between pulse transmissions of amount $VT \sin \theta$, and (2), to a displacement perpendicular both to that of (1) above and to the direction of arrival of the signal and of amount $VT \cos \theta \sin \phi$. FIG. 6 illustrates graphically the relationship between the various quantities. Here V=velocity of aircraft, T=interpulse interval, $\theta$=azimuth angle of antenna, $\phi$=vertical angle of arrival of the signal measured from the horizontal. Altitude enters into the second component since $\sin \phi = h/R$ where $h$=altitude and $R$=slant range.

The first term above is compensated by shifting the antenna centers horizontally by an amount proportional to $$K = VT \sin \theta$$

Figure 5:
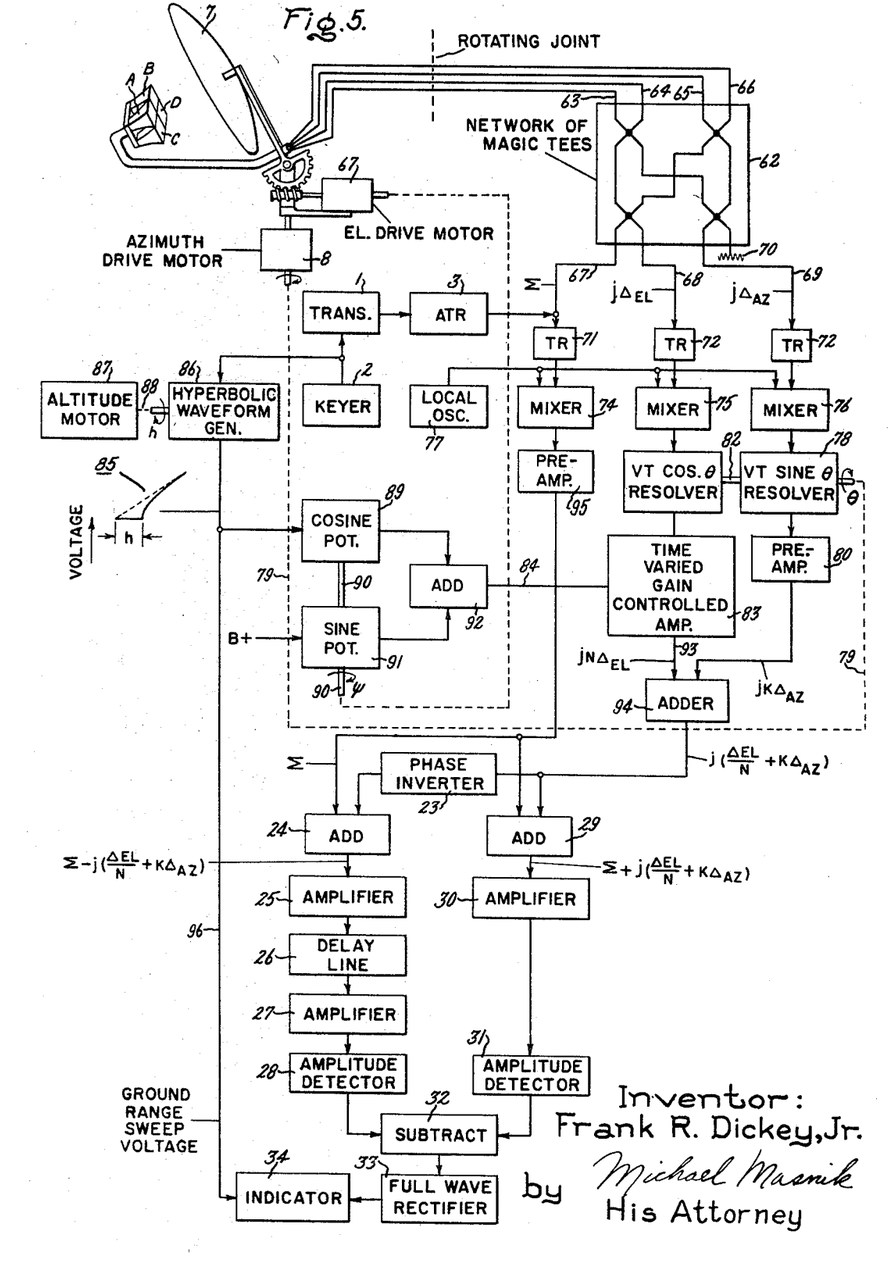
FIG. 5 is a combined block-diagram and schematic representation of a more refined arrangement for accurately compensating for radar system motion, especially of high elevation angles.

This is done in all the arrangements shown including FIGURE 5. However, in FIGURE 5, the second term is also compensated by shifting the antenna centers up or down by an amount proportional to $$N = \frac{VT \cos \theta \sin \phi}{\cos (\phi - \psi)}$$

Here $\varphi$ is the tilt angle of the antenna as shown in FIGURE 6. In this equation, if the angle $\phi$ is replaced by its equivalent in terms of altitude $h$ and range $R$, the result may be written as, $$N = \frac{VT \cos \theta}{\sin \psi + \cos \psi \sqrt{\frac{R^2}{h^2} - 1}}$$

Referring to FIG. 5 a four horn feed of the simultaneous lobing, amplitude comparison type is employed. In a manner similar to that described in connection with FIG. 1, keyer 2, recurrently keys the transmitter 1 at an established rate to supply pulses of high intensity radio frequency waves over the ATR box, the network of magic tees 62, and the four wave guide sections 63, 64, 65 and 66 to the respective horn antennas A, B, C and D. These antennas transmit the supplied pulses simultaneously in four directive overlapping beams toward remotely located objects. The resultant radar beam is swept angularly in a 360° arc by the azimuth drive motor 8 and may be adjusted in a plane by the added elevation drive motor 67. During any instantaneous azimuth and elevation angle position of the radar beam, echoes returned from remote objects irradiated by the beam are applied over the respective wave guide sections 63–66 to the network of magic T's 62 to yield a composite echo signal $\Sigma$ at the output lead 67 equal to the sum of the outputs of the four horn feeds, A, B, C and D or $(A+B)+(C+D)$. A composite signal $j\Delta EL$ is developed on lead 68 equal to the sum of the outputs of the upper antennas minus the sum of the outputs of the lower antennas or $j(A+B)-j(C+D)$. Lead 69 yields a composite echo signal $j\Delta AZ$ equal to the sum of the echo signals obtained from the left hand antenna feeds minus the sum of the antenna signals obtained from the right hand antenna feeds or $$j(A+C)-j(C+D)$$

As previously mentioned, the received echo signals developed at leads 68 and 69 are adjusted to 90° in phase as indicated by the accompanying $j$ symbol. Element 70 indicates a suitable termination for the input lead 67, 68 or 69 but at an intermediate frequency level. In a manner similar to that described in connection with FIG. 1, the $j\Delta AZ$ signal has its amplitude modulated in accordance with the signal $VT \sin \theta$ by the resolver 78 whose input shaft is mechanically coupled by linkage 79 to the azimuth drive motor 8. Resolver 79 operates in the manner described in connection with component 17 of FIG. 1. Thus the signal available from resolver 78, after amplification in the preamplifier circuit 80, is capable of compensating for any horizontal motion of the horn feeds A, B, C and D.

In order to derive the more complex signal required for compensating for vertical antenna motion, the azimuth drive motor 8 is also employed to control a $VT \cos \theta$ resolver 81 by means of the mechanical linkage 79 and the common shaft 82. This resolver is similar to resolver 78 with the exception that it modulates the amplitude of the $j\Delta EL$ signal available from mixer 75 in accordance with the product of the aircraft velocity, the radar pulse repetition period T and the cosine of the azimuth angle $\theta$. This last mentioned modulated signal is then applied to a time varied, gain controlled amplifier 83 whose instantaneous gain is controlled in accordance with a signal, to be described shortly, to yield at its output the desired composite echo signal $jN\Delta EL$ which compensates for the vertical motion of the antenna.

The time varied, gain control voltage applied to amplifier 83 over lead 84 is derived by first generating a periodic hyperbolic wave $$\sqrt{\frac{R^2}{h^2} - 1}$$

which is of the form shown at 85. This hyperbolic waveform is obtained by keying a hyperbolic wave form generator 86 recurrently with the output of keyer 2, while varying an output signal controlling parameter contained in 86 with the instantaneous altitude $h$ of the radar antenna with respect to ground objects as determined by an altitude motor 87 and the angular position of shaft 88. A suitable hyperbolic waveform generator is shown on p. 301–305 of the Radiation Laboratory Series, vol. 19, Waveforms, by B. Chance, McGraw Hill, 1949.

The hyperbolic signal 85 available from generator 86, is applied to a cosine potentiometer 89 where it is multiplied by the cosine of the elevation antenna angle 4 as determined by the angular position of drive shaft 90 coupled to the elevation drive motor 67. A sine potentiometer 91 is also connected to the same shaft 90 and provides an output signal proportional to the sine of the elevation angle 4. The multiplied hyperbolic wave form signal 85 and the output of the sine potentiometer 91 are added in circuit 92 to yield the gain control signal (sin $$\sin \psi + \cos \psi \sqrt{\frac{R^2}{h^2} - 1}$$

This gain control signal is applied over lead 84 to control the gain of amplifier 83 is accordance with the signal $$\frac{1}{\sin \psi + \cos \psi \sqrt{\frac{R^2 - 1}{h^2}}}$$

The operation of circuits 81 and 83 yields an output signal $jN\Delta EL$ at lead 93 where $N$ is the amplitude modulation component previously defined.

The composite echo signals $jK\Delta AZ$ and $jN\Delta EL$ are added in circuit 94 to yield a composite echo signal providing motion compensation information for various antenna positions and for various altitudes and ranges of operation. This resultant composite signal is added and subtracted from the difference signal $\Sigma$, available from mixer 74 and preamplifier 95, in a manner similar to that described in connection with FIG. 1 by use of the phase inverter and adder circuits 23, 24 and 29. In order to introduce the proper time phase for the otherwise correct space phase relationship of the signals available from adder circuits 24 and 29, the remaining circuitry 25–30 operate in a manner similar to that described in connection with FIG. 1 such that upon subtraction in circuit 32 a properly compensated composite echo signal is derived. The resultant compensated MTI signals available from subtraction circuit 32 are rectified by circuit 33 and applied to an indicator 34 for display purposes. A portion of the hyperbolic wave form available from generator 86 is also applied over lead 95 to the cathode ray tube indicator 34 to control the ground range sweep circuits thereof in a conventional manner.

While specific component designs have been described in connection with each of the diagrams it should be recognized that various alternative arrangements are readily possible. For example in FIG. 1 while the phase shift was introduced at an intermediate frequency level, it may be introduced at a radio frequency level as by use of a radio frequency resolver. A suitable resolver may comprise a circular wave guide with the plane of polarization rotated linearly and with an output being derived from the signal components developed in a given plane. Also while only the difference signal was modified in amplitude to introduce the desired amount of phase shift, the difference signal or a composite of the difference and sum signals may be modified to obtain the same results. Furthermore, while measurements of the motion of the antenna patterns have been recited as having been made of the components of motion at right angles to or 90 degrees from the center of directivity of said patterns, it is obvious that some departure from the 90 degrees is possible in certain applications. For example, in certain applications, some departure from 90 degrees could result in a degradation of the cancellation which might still be acceptable.

While a specific embodiment has been shown and described, it will of course be understood that various modifications may yet be devised by those skilled in the art which will embody the principles of the invention and found in the true spirit and scope thereof.

What I claim is new and desire to secure by Letters Patent of the United States is:

1. A simultaneous lobing radar antenna system comprising means for producing a pair of directive, echo comparison reception patterns, means for deriving separate signals corresponding respectively to the sum and difference of radar echoes received within said patterns, and means for varying the effective phase center of said reception patterns comprising means for adjusting the relative amplitude of said sum and difference signals, and means for algebraically combining said adjusted sum and difference signals to provide a composite signal having a varied phase center antenna characteristic.

2. A simultaneous lobing radar antenna system comprising means for producing a pair of directive, echo comparison reception patterns, means for deriving separate signals corresponding respectively to the sum and difference of radar echoes received within said patterns, and means for varying the effective phase center of said reception patterns comprising means for adjusting the relative amplitude of said sum and difference signals, and means for alternately adding and subtracting said adjusted sum and difference signals to provide a composite signal having an alternately varied phase center antenna characteristic.

3. A radar system for detecting objects in space comprising an antenna system adapted to move in space with respect to said objects, said antenna system adapted to recurrently transmit pulses of radio waves into space in at least one narrow beam, means for compensating for the component of motion of said antenna system at right angles to the center of directivity of said beam to obtain a desired phase relationship between transmitted pulses and corresponding echoes received from objects intercepted by said transmitted pulses comprising means for measuring said component of motion of said antenna system relative to a reference surface, and means for effectively altering the electrical phase center of said antenna system in accordance with said component of measured antenna system motion.

4. In combination, an antenna system adapted to simultaneously receive at two separate feed points pulses of electromagnetic waves reradiated from objects in space, means for deriving in respective channels the sum and differences of said reradiated waves received at said points, means for altering the amplitude of one of said derived signals in a predetermined manner with time, means for obtaining in separate channels the sum and difference of the other of said derived signals and said altered signals, means for delaying one of said two last named signals a predetermined amount, and means for subtracting the earlier of said obtained signals from said delayed other signal to derive a resultant signal, and means for utilizing said resultant signal.

5. An arrangement for detecting objects in space comprising a system adapted to move in space with respect to said objects, said system adapted to recurrently transmit waves into space in a narrow beam, means for compensating for the effect of said system motion on the relative phases of the transmitted waves received from objects intercepted by said transmitted waves comprising means for measuring the component of motion of said system at right angles to the center of directivity of said beam, and means for altering the effective phase center of said system in accordance with said component of measured motion, comprising means responsive to said received waves and controlled by said component of measured system motion for providing an output signal having a characteristic corresponding to the alteration of said phase center.

6. A simultaneous lobing antenna system comprising a pair of directive antennas, means for deriving a signal having a characteristic corresponding to varying the effective phase center of said antenna system comprising means for deriving separate signals corresponding respectively to the sum and difference of waves received by each of said antennas, said means for deriving also comprising means for adjusting the relative amplitude of said sum and difference signals and for establishing a 90 degree phase difference between said sum and difference signals, and means for algebraically combining said adjusted and established sum and difference signals to provide said first named signal.

7. An antenna system comprising a pair of antennas having a given phase center, means for effectively changing said phase center comprising a magic-T transmission line junction, said junction comprising two input and two output channels, means for applying the output of each antenna to a respective input channel, means for adjusting the relative amplitude of the resultant outputs developed in said output channels in a predetermined manner with time, means for algebraically adding said adjusted outputs, a utilization-device, and means for applying said added outputs to said device.

8. An antenna system for receiving signals comprising a pair of antennas, means for deriving an alternating signal in a first channel corresponding to the sum of the signals received by said antennas, means for deriving an alternating signal in a second channel corresponding to the difference of the signals received by said antennas, a control signal, means for adjusting the relative amplitude of said sum and difference signals in accordance with the amplitude of said control signal, and means for algebraically combining said relatively adjusted sum and difference signals.

9. A simultaneous lobing antenna system for receiving signals comprising a pair of antennas of the amplitude comparison type, means for varying the phase center of said antenna system comprising means for deriving an alternating signal in a first channel corresponding to the sum of the signals received by said antennas, means for deriving an alternating signal in a second channel corresponding to the difference of the signals received by said antennas, a control signal, means for shifting the relative phases of said alternating sum and difference signals ninety electrical degrees at their operating frequency and for adjusting the relative amplitudes of said sum and difference signals in accordance with the amplitude of said control signal, and means for algebraically combining said relatively adjusted and shifted sum and difference signals to derive a composite signal having a varied antenna phase center characteristic.

10. A pair of directive antennas for comparing the phase or amplitude of received radar pulses, means for combining the pulses received by said antennas to provide a wave in a first channel corresponding to the sum of said received pulses, and a wave in a second channel corresponding to the difference of said received pulses, means for deriving a first control signal corresponding to changes in the azimuth position of said antenna system, means for deriving a second control signal corresponding to changes in the elevation position of said antenna system, means for relatively adjusting the amplitudes of said sum and difference signals in accordance with said first and said second control signals, and means for algebraically adding said relatively adjusted sum signal with said relatively adjusted difference signal shifted ninety electrical degrees at its operating frequency to derive a composite signal, means for delaying said composite signal a predetermined time interval equal to the period between successively received waves, means for algebraically subtracting said delayed signal with an undelayed composite signal received at a different period to derive a resultant signal, and means for utilizing said resultant signal.

11. A pair of directive antennas for comparing the phase or amplitude of received waves, means for combining the waves received by said antennas to provide a wave in a first channel corresponding to the sum of said received waves, and a wave in a second channel corresponding to the difference of said received waves, means for deriving a control signal corresponding to changes in position of said antenna system, means for adjusting the relative amplitudes of said sum and difference signals in accordance with said second control signal, and means for algebraically adding said relatively adjusted sum signal with said relatively adjusted difference signal to derive a composite signal, means for delaying said composite signal a predetermined time interval equal to the period between successively received signal, means for algebraically subtracting said delayed signal with an undelayed composite signal received at a different time, to derive a resultant signal.

12. A pair of directive antennas for comparing the phase or amplitude of received waves, means for combining the waves received by said antennas to provide a wave in a first channel corresponding to the sum of said received waves, and a wave in a second channel corresponding to the difference of said received waves, means for deriving a control signal corresponding to changes in position of said antenna system, means for adjusting the relative amplitudes of said sum and difference signals in accordance with said second control signal, and means for algebraically adding said relatively adjusted sum signal with said relatively adjusted difference signal to derive a composite signal, means for delaying said composite signal a predetermined time interval equal to the period between successively received signal, means for algebraically subtracting said delayed signal with an undelayed composite signal received at a different time, to derive a resultant signal, and means for utilizing said signal to display only those waves being received from a moving source of waves.

13. An arrangement comprising a system adapted to move with respect to a fixed reference surface, and to transmit waves to a remote object, said system comprising a pair of separate feeds adapted to receive the transmitted waves reradiated from said object, means for deriving the sum and difference of waves received at said separate feeds, means for varying the relative amplitude of one of said derived signals in accordance with the formula $VT \sin \theta$ where $V$ is the horizontal component of the velocity of said system with respect to said surface, $T$ is a given time delay and $\theta$ is the instantaneous azimuth angular displacement of said system with respect to the direction of the velocity of said system and means for providing a composite signal having a varied antenna phase center characteristic comprising means for combining said varied one of said designed signals with the said derived signals to produce said composite signal.

14. An arrangement comprising an antenna system adapted to move with respect to a given reference surface, and to transmit pulses to remote objects, said antenna systems comprising a pair of separate feeds adapted to receive the transmitted pulses reradiated from said objects, means for deriving the sum and difference of pulses received at said separate feeds, means for varying the relative amplitude of one of said derived signals in accordance with the formula $VT \sin \theta$ where $V$ is the horizontal component of the velocity of said antenna system with respect to said surface, $T$ is an integral multiple of the interpulse time interval and $\theta$ is the instantaneous azimuth angular displacement of said antenna system with respect to the direction of the velocity of said antenna system and means for providing a signal having a varied antenna phase center characteristic comprising means for combining said varied one of said desired signals with the other of said derived signals.

15. An arrangement comprising an antenna system adapted to move with respect to a given reference surface, and to transmit pulses to remote objects, said antenna systems comprising a pair of separate feeds adapted to receive the transmitted pulses reradiated from said objects, means for deriving the sum and difference of pulses received at separate feeds, means for varying the relative amplitude of one of said derived signals in accordance with the formula $VT \sin \theta$ where $V$ is the velocity of said antenna system with respect to said surface, $T$ is the interpulse time interval and $\theta$ is the instantaneous angular displacement of said antenna system with respect to the direction of the velocity of said antenna system and means for providing a signal having a varied antenna phase center characteristic comprising means for combining said varied one of said derived signals with the other of said derived signals.

16. An arrangement comprising an antenna system adapted to move with respect to a reference surface and to recurrently transmit pulses to remote objects, said system comprising a pair of separate feeds adapted to receive said transmitted pulses upon reradiation from said objects, means for deriving separate output signals comprising the sum and difference of pulses received by said separate feeds, means for modulating the relative amplitudes of said derived signals in accordance with the formula $VT \cos \theta \sin \varphi$ where $V$ is the horizontal velocity of the antenna system with respect to said surface, $T$ is the interpulse time interval, $\theta$ is the instantaneous azimuth angular displacement of said antenna system with respect to the instantaneous direction of the antenna system velocity, and $\varphi$ is the vertical angle of arrival of the received reradiated pulses measured from the horizontal, and means for providing a composite signal having a varied antenna phase center characteristic comprising means for combining said modulated derived one of said signals with the other of said derived signals to derive said composite signal.

17. An arrangement comprising an antenna system adapted to move with respect to a reference surface and to recurrently transmit pulses to remote objects, said system comprising a pair of separate feeds adapted to receive said transmitted pulses upon reradiation from said objects, means for deriving separate output signals comprising the sum and difference of pulses received by said separate feeds, means for modulating the relative amplitudes of said derived signals in accordance with the formula $VT \cos \theta \sin \phi$ where V is the velocity of the antenna with respect to said surface, T is the interpulse time interval, $\theta$ is the instantaneous angular displacement of said antenna system with respect to the instantaneous direction of the antenna system velocity, and $\phi$ is the vertical angle of arrival of the received reradiated pulses, and means for producing a composite signal having a varied antenna phase center characteristic comprising means for combining said modulated derived one of said signals with the other of said derived signals to derive said composite signal.

18. An arrangement comprising a system adapted to move with respect to a fixed reference surface, and to transmit waves to a remote object, said system comprising at least two separate feeds adapted to receive the transmitted waves reradiated from said object in a wave reception pattern, means for deriving the sum and difference of waves received at said separate feeds, means for varying the relative amplitude of one of said derived signals in accordance with the formula $V_hT$ where $V_h$ is the component of system velocity which is perpendicular to the center of said wave reception pattern, and T is a predetermined time interval, and means for providing a composite signal having a varied antenna phase center characteristic comprising means for combining said modulated one of said derived signals with the other of said derived signals to produce said composite signal.

19. An arrangement comprising an antenna system adapted to move with respect to a reference surface, and to transmit pulses to remote objects, said antenna system comprising a pair of separate feeds adapted to receive the transmitted pulses reradiated from said objects in a reception pattern, means for deriving the sum and difference of pulses received at said separate feeds, means for varying the relative amplitude of one of said derived signals in accordance with the formula $V_hT$ where $V_h$ is the component of antenna system velocity which is perpendicular to the center of said antenna pulse reception pattern, and T is an integral multiple of the interpulse time interval, and means for providing a composite signal having a varied antenna phase center characteristic comprising means for combining said modulated one of said derived signals with the other of said derived signals to produce said composite signal.

20. In combination an antenna system adapted to move with respect to a reference surface, said antenna system comprising signal reception patterns of the phase comparison type, means for combining the signals received within said patterns to derive sum and difference signals thereof, means for amplitude modulating one of said combined signals in accordance with the instantaneous azimuth position of said reception patterns, means for adding and subtracting said modulated one of said combined signals and the other of said combined signals to provide further sum and difference signals, means for delaying one of said further signals for a predetermined time interval, means for amplitude detecting said delayed signal and said other further signal to derive first and second amplitude detected signals, means for subtracting said amplitude detected signals to derive a subtracted signal, means for full wave rectifying said subtracted signal, and means for indicating said rectified signal.

21. In combination an antenna system adapted to move with respect to a reference surface, said antenna system comprising signal reception patterns of the amplitude comparison type, means for combining the signals received within said patterns to derive sum and difference signals thereof, means for amplitude modulating one of said combined signals in accordance with the instantaneous azimuth position of said reception patterns and for shifting its phase ninety electrical degrees, means for adding and subtracting said modulated one of said combined signals and the other of said combined signals to provide further sum and difference signals, means for delaying one of said further signals for a predetermined time interval, means for amplitude detecting said delayed signal and said other further signal to derive first and second amplitude detected signals, means for subtracting said amplitude detected signals to derive a subtracted signal, means for full wave rectifying said subtracted signal, and means for indicating said rectified signal.

22. An arrangement comprising an antenna system adapted to move with respect to a reference surface, said antenna system adapted to transmit pulses and to receive reradiations of said transmitted pulses from a remote object in a reception pattern of the amplitude comparison type, means for combining said reradiated pulses received within said reception patterns to provide separate sum and difference signals, means for amplitude modulating one portion of said difference signal in accordance with a signal $VT \sin \theta$ to derive a first modulated output where V is the antenna system velocity in a horizontal plane, T is the interpulse time interval and $\theta$ is the azimuth.

23. In combination, means for receiving waves in two respectively different, moving reception patterns, means for measuring the component of motion of said patterns at right angles to teh resultant center of directivity of said patterns, and means for modulating said received waves in accordance with the amount of motion of said patterns measured in recurrent time intervals.

24. In combination, means for receiving waves in at least two respectively different, moving reception patterns, means for measuring the component of motion of said patterns at right angles to the resultant center of directivity of said patterns, and means for modulating said received waves to simulate the effective displacement of the phase centers of said reception patterns by an amount equal and opposite to the amount of said component of motion measured in a given time interval.

25. In combination, means for compensating for the motion of a moving target detection antenna system comprising means for receiving echo waves in two respectively different reception patterns, and means for amplitude modulating said received waves to simulate the effective displacement of the electrical phase centers of each of said reception patterns by an amount equal and opposite to the amount of displacement produced by said antenna system motion in a given time interval.

26. An arrangement for compensating for the motion of an object detection system comprising at least two feeds each adapted to receive echo waves in respectively different reception pattern means for measuring in a given time interval the component of displacement of said two feeds at right angles to the center of directivity of the resulting reception pattern, and means for effectively simultaneously displacing the electrical phase centers of said reception patterns by an amount equal and opposite to the amount of displacement measured in said given time interval.

27. An antenna system for receiving signals comprising a pair of radiant acting elements, means for deriving an alternating signal in a first channel corresponding to the sum of the signals received by said antennas, means for deriving an alternating signal in a second channel corresponding to the difference of the signals received by said antennas, a control signal of changing amplitude, means for adjusting the relative amplitude of said sum and difference signals in accordance with the amplitude of said control signals, and means for algebracially combining said relatively adjusted sum and difference signals.

28. An arrangement for receiving signals comprising a pair of angularly movable radiant acting elements, means for deriving an alternating signal in a first channel corresponding to the sum of the signals received by said antennas, means for deriving an alternating signal in a second channel corresponding to the difference of the signals received by said antennas, a source of periodic square waves, means for modulating said square waves in accordance with the instantaneous angular position of said elements to derive modulated waves, means for adjusting the relative amplitude of said sum and difference signals in accordance with the amplitude of said modulated waves, and means for algebraically combining said relatively adjusted sum and difference signals.

29. In combination, an arrangement for receiving waves comprising at least two wave reception elements, means for measuring the component of motion of said reception elements at right angles to the center of directivity of the resultant reception pattern of said elements, and means for modulating said received waves in accordance with the amount of said component of motion.

30. In combination, a pair of reception elements for receiving waves, means for measuring the component of motion of said elements at right angles to the center of directivity of the resultant reception pattern of said elements, means for deriving separate signals corresponding respectively to the sum and difference of waves received by each of said elements, means for amplitude modulating said separate signals in accordance with the measured amount of said component of motion to derive separate modulated signals, means for time delaying one of said modulated signals with respect to the other, means for subtracting said resultant separate signals to derive an output signal.

31. A wave reception arrangement comprising at least one pair of wave reception elements, means for measuring the component of motion of said elements at right angles to the center of directivity of the resultant reception pattern of said elements, means for deriving separate signals corresponding respectively to the sum and difference of waves received by each of said elements, means for amplitude modulating said separate sum and difference signals in accordance with the amount of said measured motion of said elements to derive separate modulated signals, means for alternately selecting said modulated signals, means for processing each of said modulated signals to derive a relatively undelayed modulated signal and a time delayed modulated signal, means for subtracting one of said signals which is underlayed with the other of said modulated signals which is delayed to derive resultant signals.

32. A pulse echo object detection system comprising means for producing a pair of directive pulse echo comparison reception patterns, means for deriving separate signals corresponding respectively to the sum and difference of pulse echoes received within said patterns, means for varying the effective phase center of said reception patterns comprising means for adjusting the relative amplitude of said sum and difference signals, and means for algebraically combining said adjusted sum and difference signals to provide a composite signal having a varied phase center pulse echo reception characteristic.

33. An arrangement for compensating for the relative motion of a wave receiving antenna system with respect to a source of waves comprising means for receiving waves from said source in at least two different wave reception patterns, means for adjusting the relative amplitude of the waves received in said two reception patterns in accordance with the amount of said relative motion to simulate an effective displacement of the electrical phase centers of said reception patterns by an amount equal and opposite to said amount of relative motion of said antenna system with respect to said source of waves, and means for algebraically adding said relative amplitude varied waves to provide a single output wave.

34. An arrangement for compensating for the relative displacement of a wave receiving antenna system with respect to a source of waves comprising means for receiving waves from said source in two different wave characteristic reception patterns, means for adjusting the relative amplitude of said received waves in accordance with the amount of said relative displacement to simulate the effective displacement of the electrical phase centers of said reception patterns by an amount equal and opposite to the relative displacement of said antenna system with respect to said source of waves in a given time interval, and means for algebraically adding said amplitude varied waves to provide a single output wave.

References Cited

UNITED STATES PATENTS

| | | | |
|---|---|---|---|
| 2,621,243 | 12/1952 | Sunstein | 343—7.7 |
| 2,631,279 | 3/1953 | Bollinger | 343—16 |
| 2,678,440 | 5/1954 | Watt | 343—7.7 |
| 2,710,398 | 6/1955 | Emslie | 343—7.7 |

RODNEY D. BENNETT, *Primary Examiner.*

C. L. WHITHAM, *Assistant Examiner.*

U.S. Cl. X.R.

343—16